United States Patent [19]

Serbent et al.

[11] 4,144,052
[45] Mar. 13, 1979

[54] PROCESS OF DIRECTLY REDUCING IRON-CONTAINING OXIDIC MATERIALS

[75] Inventors: Harry Serbent, Hanau; Wolfram Schnabel, Hattersheim, both of Fed. Rep. of Germany

[73] Assignee: Metallgesellschaft Aktiengesellschaft, Frankfurt am Main, Fed. Rep. of Germany

[21] Appl. No.: 844,853

[22] Filed: Oct. 25, 1977

[30] Foreign Application Priority Data

Nov. 25, 1976 [DE] Fed. Rep. of Germany ....... 2653512

[51] Int. Cl.² ............................................. C21B 13/08
[52] U.S. Cl. ........................................................ 75/36
[58] Field of Search ....................................... 75/36, 33

[56] References Cited

U.S. PATENT DOCUMENTS

| 2,269,465 | 1/1942 | Lykken | 75/33 |
| 3,881,916 | 5/1975 | Serbent et al. | 75/36 |
| 3,890,138 | 6/1975 | Hockin | 75/33 |

FOREIGN PATENT DOCUMENTS 1021474  3/1966  United Kingdom ........................ 75/33

Primary Examiner—M. J. Andrews
Attorney, Agent, or Firm—Sprung, Felfe, Horn, Lynch & Kramer

[57] ABSTRACT

A process has been developed for directly reducing iron-containing oxidic materials to sponge iron by means of a moist solid carbonaceous reducing agent having a high volatile content in a rotary kiln in which the solid charge and a gaseous atmosphere move in counter-current flow through the kiln.

10 Claims, No Drawings

PROCESS OF DIRECTLY REDUCING IRON-CONTAINING OXIDIC MATERIALS

BACKGROUND OF THE INVENTION

This invention relates to a process of directly reducing iron-containing oxidic materials to sponge iron by means of a moist solid carbonaceous reducing agent having a high volatile content in a rotary kiln in which the solid charge and a gaseous atmosphere move in counter-current flow through the kiln.

The direct reduction of iron ores in a rotary kiln differs from the blast furnace process in that solid reducing agents having a high reactivity are particularly suitable. The term "reactivity" is defined as the ability of solid reducing agents to react with CO in accordance with Bouduard's reaction $$CO_2 + C \rightleftharpoons 2\,CO$$

(See Great Britain — PS 1,307,869).

Reducing agents having a particularly high reactivity include, e.g., brown coal, lignite, peat, and peat coke. They permit of an operation of a given rotary kiln at lower temperatures and higher throughput rates and have very high moisture contents in a raw state. For instance, brown coals having a water content up to about 60% by weight are being mined.

It has been believed so far that for use in the direct reduction in a rotary kiln these reducing agents must be predried to a water content of about 15 to 25% or must be entirely dried.

It has been described, e.g., in "Stahl und Eisen" 85 (1965), on page 1375 that brown coal is blown into the rotary kiln from the discharge end, part of the brown coal is charged through the kiln shell and the brown coal is desirably dried before to reduce its moisture content from 55% to less than 15% so that an excessive heat consumption in the process is avoided. Printed German Application No. 1,433,296 teaches a predrying to a water content of 10-20% for the same purpose. In accordance with Australian Patent Publication No. 423,616, a solid reducing agent having a high volatile content and a water content of 22.8% is blown into a rotary kiln from the discharge end thereof.

As the reducing agent is dried, its particles are highly disintegrated to much smaller particles, which involve difficulties as the reducing agent is stored and handled and as it is fed into the rotary kiln. Inflammation and an ecologically undesirable formation of dust may occur as the reducing agent is stored and handled. On the other hand, the reducing agent must be stored and handled in such a manner that the effect of the previous drying is not eliminated by an action of moisture. Owing to the light weight of the individual particles, the feeding of the dried reducing agent into the rotary kiln at the charging end thereof results in considerable losses of reducing agent entrained by the exhaust gas.

These problems can be solved in that the dried reducing agents are briquetted. Opened German Specification No. 2,501,182 describes a process in which a highly reactive reducing agent, which is agglomerated and has a volatile content of 20-50% is fed into the rotary kiln at the charging end thereof and is heated at such a rate that it has disintegrated to small particles when leaving the heating-up zone of the rotary kiln so that dust losses and the proportion of combustible volatile constituents in the exhaust gas are substantially reduced. On the other hand, the reducing agent must be dried and briquetted in a preceding process step. Besides, the sensible and latent heat contents of the exhaust gases must be utilized in a separate process step, for economical reasons, and this is possible only when there is a consumer for the energy which is thus recovered. It is apparent that these process steps involve a considerable expenditure. Moreover, there are various types of brown coal which can be briquetted only with difficulty. The briquetting of brown coal becomes increasingly difficult as the carbonification of the brown coal increases, e.g., with brown coal from lower deposits.

It is an object of the invention to enable the economical use of highly reactive, solid reducing agents having high water and volatile contents for the direct reduction in the rotary kiln without need for substantial pretreatments and separate process steps.

This object is accomplished according to the invention in that solid carbonaceous reducing agents having a water content of about 30–70% and a high volatile content of about 30 to 65% (preferably about 34 to 60%) by weight of the dry reducing agent are fed into the rotary kiln at the charging end thereof, the water content and the combustible gaseous constituents evolved by the devolatilization of the reducing agent and entering the drying zone of the rotary kiln and the heat content of the gases are so matched that the reducing agent is dried in the drying zone and the exhaust gas contains less than about 1% combustible gaseous constituents and the combustion of the combustible gaseous constituents in the drying zone is controlled by a feeding of oxygen-containing gases into the rotary kiln. The non-briquetted reducing agent having the moisture content with which it has been mined or with which it has been supplied is directly fed into the rotary kiln at the charging end. In most cases the ore is also charged at the charging end but may alternatively be charged into the kiln in an intermediate zone. The drying zone of the kiln is defined as the first part of the kiln, seen from the charging end. In the drying zone, the moisture content of the reducing agent and of the other constituents of the charge are expelled off as water vapor as the temperature of the charge increases. The drying zone is succeeded by a devolatilizing zone, in which the temperature is sufficiently high for devolatilization so that at least part of the volatile constituents of the reducing agent are expelled off in the form of combustible gaseous constituents. Depending on the type of reducing agent, the devolatilization begins at about 250° to 350° C. The thermal energy required for the temperature rise in the devolatilizing zone is supplied by hot gases coming from the succeeding reducing zone. Combustible gaseous constituents are burnt in the devolatilizing zone, which is supplied with oxygen-containing gases, which consist generally of air and may be supplied through shell tubes distributed along the length of the rotary kiln. Part of the reducing agent may also be burnt in the devolatilizing zone for a generation of heat. There is no defined boundary between the devolatilizing and reducing zones, which gradually merge one into the other. The reducing zone begins in the temperature range of about 700° to 800° C. Higher iron oxides may be reduced to lower iron oxides even in the devolatilizing zone if the temperature and reducing conditions required for this purpose are provided. Besides, volatile constituents may be expelled from the reducing agent also in the reducing zone. Oxygen is supplied to the drying zone at such a rate that the combustible gaseous constituents are burned to a large extent. The surplus of oxygen required for this purpose is preferably increased in the direction toward the charging end. The rate at which combustible gaseous constituents flow from the devolatilizing zone into the drying zone may be controlled by a selection of the ratio of the moisture content of the reducing agent and the other constituents of the charge to the volatile content of the reducing agent. A certain control can also be effected in that the temperature gradient is increased so that the length of the devolatilizing zone is decreased and the length of the reducing zone is correspondingly increased and a larger part of the constituents is utilized in the reducing zone. Materials which contain oil and grease, such as roll scale, may also be charged as iron-containing oxidic material; in that case the combustible constituents released from the oil- and grease-containing materials are used like the gases produced by the devolatilization.

In accordance with a preferred feature the reducing agent has a water content of about 40–70% by weight and a volatile content of about 45–60% by weight of the dry reducing agent, or the reducing agent has a water content of about 30–45% by weight and a volatile content of about 35–45% by weight of the dry reducing agent. These ratios result in particularly good operating conditions.

If the reducing agent is deficient in volatile content, the additional heat required for drying is supplied to the drying zone and/or devolatilizing zone by means of shell burners in accordance with an embodiment of the invention. Thus even where the reducing agent does not meet the above-mentioned ratios of water content to volatile content because of a deficiency in volatile matter, the advantages due to the use of wet reducing agents can, nevertheless, be maintained without considerable additional expenditure by supplying additional heat as indicated above.

If the reducing agent has a surplus volatile content, carbonaceous materials having a low volatile content may be admixed, in accordance with an embodiment feature of the invention. If the volatile content is so high that the required ratio cannot be obtained and the combustion of the volatile constituents in the drying zone would merely increase the temperature of the exhaust gas, this feature permits the process to be carried out without need for a considarable additional expenditure. Surplus carbonaceous material which has been separated from the material discharged from the kiln may be used as a carbonaceous material having a low volatile content.

According to another embodiment of the invention, the heat content of the gases entering the drying is increased by a supply of external heat provided by means of shell burners and/or central burners. Additional heat may be supplied by a combustion of gas or oil in the drying zone and/or devolatilizing zone and/or reducing zone so that the drying and devolatilizing zones can be decreases and the reducing zone can be increased in length, a shorter kiln can be operated at a given throughput rate or a kiln having a given length can be operated at a higher throughput rate.

According to a preferred feature, oxygen-containing gases are blown into the charge through nozzle-blocks at least in the drying zone of the preheating zone of the rotary kiln. The term "nozzle-blocks" is defined as gas inlets which extend through the furnace wall and the refractory lining of the rotary kiln and have outlet openings disposed in or slightly outwardly of the inside surface of the refractory lining. The nozzle-blocks may consist of metallic or ceramic materials and are distributed along the length of the blow-in zone of the rotary kiln. The oxygen containing gases are always blown in at least through the charge bed and preferably also into the free space in the kiln. The term "preheating zone" is defined as that zone of the rotary kiln in which the charge is preheated to the temperature of the reducing zone, e.g., the preheating zone includes the drying and devolatilizing zones defined above. The blowing of oxygen-containing gases into the charge in the preheating zones ensures that oxygen for ignition and combustion is available in sufficient quantites also within the charge so that the heat transfer is initiated not only at the surface of the charge but simultaneously at numerous points within the charge. As a result, the preheating rate is much increased and the increase in the length of the preheating zone necessitated by the use of moist reducing agents is offset, at least in part. Besides, the preheating zone may be operated under oxidizing conditions whereas there is no need to transfer a considerably surplus of oxygen through the reducing zone.

In accordance with a preferred feature, oxygen-containing gases are blown into the charge through nozzle-blocks in a zone which extends from the charging end over approximately one-third of the length of the rotary kiln. This ensures an operation of the rotary kiln at a particularly high throughput rate in conjunction with the use of wet reducing agents.

According to a preferred feature, about 20–60% of the total rate at which oxygen-containing gases are supplied into the rotary kiln are blown into the rotary kiln through the nozzle-blocks. This results in a supply of the oxygen-containing gases in a distribution which is highly favorable with a view to a high preheating rate in conjunction with the use of moist reducing agents and a low volumentric gas rate.

According to a preferred feature, the remaining oxygen-containing gases are blown into the rotary kiln at the discharge end thereof and approximately parallel to the longitudinal direction of the longitudinal axis of the rotary kiln at a velocity of flow of at least 50 m/sec. The jet of the oxygen-containing gases blown into the kiln is virtually maintained in the kiln as a coherent jet and is continuously consumed in the several zones of the kiln in dependence on the oxygen requirement. The rate at which the gas is blown is controlled in accordance with the oxygen requirement and with an allowance for the rate at which oxygen is blown through the nozzle-blocks. The blowing of oxygen-containing gases at the discharge end must be effected in such a manner that the jet contacts the charge nowhere. This injection eliminates the otherwise existing need to supply oxygen-containing gases through shell tubes in the reducing zone and results in improved flow conditions in the kiln.

The invention will be explained more fully and with reference to the Examples.

EXAMPLE 1

Brown coal having a moisture content of 55% and ore pellets containing 67% Fe were jointly charged into a rotary kiln having an inside diameter of 0.80 m and a length of 12.00 m. The ratio of C fixed to Fe amounted to 0.40. The rotary kiln was operated without external heating and was provided with 8 shell tubes.

In a dry state, the coal had the following analysis:
44% fixed carbon
50% volatile constituents 6% ash.

A metallization of 90% was achieved at a throughput rate of 250 kg/h. The exhaust gas leaving the rotary kiln at a temperature of about 400° C. had the following composition in percent:

$CO_2$: 21.0–23.0
$O_2$: 2.3–3.0
CO: 0.0
$H_2$: 0.4–0.6
$CH_4$: 0.3–0.5
balance nitrogen.

The drying zone accounted for about 40% of the rotary kiln and was operated with a gas entrance temperature of 750° C., a gas exit temperature of 400° C. and a solids exit temperature of about 330° C.

The devolatilizing zone accounted for about 20% of the length of the kiln and was operated with a gas entrance temperature of about 950° C. and a solids exit temperature of about 850° C. About 55% of the total iron content was present as divalent iron and about 7% as metallic iron.

The mean temperature in the reducing zone amounted to 1020° C. in the gas space and to 930° C. in the charge.

EXAMPLE 2

The same rotary kiln was charged with brown coal having a water content of 38% and a dry analysis of 42% volatile constituents, 51% C fixed, 7% ash, together with ore pellets which contained 67% Fe. The ratio of C fixed to Fe amounted to 0.40. The rotary kiln was operated without external heating.

A metallization of 91% was achieved at a throughput rate of 400 kg/h.

The exhaust gas leaving the kiln at 450° C. had the following composition in percent:

$CO_2$: 23.0–25.0
$O_2$: ≦ 1.0
CO: ≦ 0.2
$H_2$: ≦ 0.4
$CH_4$: ≦ 0.1
Nitrogen: balance.

The drying zone accounted for about 20% and the devolatilizing zone to about 30% of the length of the kiln.

The mean temperatures in the reducing zone were 1050° C. in the gas space and 960° C. in the charge bed.

EXAMPLE 3

After the experiment described as Example 1, three shell tubes in the first half of the kiln were replaced by nozzle-blocks and the kiln was operated under the same conditions in other respects and supplied with the same raw materials. The length of the drying and devolatilizing zones could now be decreased to one-half so that the charge could be heated to about 880° C. within 30% of the length of the kiln.

In this experiment, the throughput rate (pellet supply rate) could then be increased from 250 kg/h to 360 kg/h in conjunction with a metallization above 90%.

The measured composition of the exhaust gas was within the limits stated in Example 1. The exhaust gas temperature was about 500° C.

The use of the nozzle-blocks which had been inserted did not influence the reducing zone.

In this experiment, the remaining five shell tubes provided in the reducing zone were subsequently removed and the required process air was fed through a central feeder at the discharge end of the kiln. If the raw material supply rates were maintained, the metallization decreased slightly from about 93% to about 91%.

The advantages of the invention reside in that highly reactive reducing agents, which are inexpensive because they are rather moist, can be supplied into a rotary kiln at the charging end thereof in the production of sponge iron with high economy.

What is claimed is:

1. A process for directly reducing iron-containing oxidic material to sponge iron by means of a moist solid carbonaceous reducing agent having a high volatile content in a rotary kiln in which the solid iron-containing charge and a gaseous atmosphere move in countercurrent flow through the kiln characterizied in that solid carbonaceous reducing agents having a water content of 30–70% and a high volatile content are fed into the rotary kiln at the charging end thereof, the water content and the combustible gaseous constituents evolved by the devolatilization of the reducing agent and entering the drying zone of the rotary kiln and the heat content of the gases being so matched that the reducing agent is dried in the drying zone and the exhaust gas contains less than about 1% combustible gaseous constituents and the combustion of the combustible gaseous constituents in the drying zone is controlled by a feed of oxygen-containing gaseous into the rotary kiln.

2. A process according to claim 1, characterized in that the reducing agent has a water content of 40–70% by weight and a volatile content of 45–60% by weight of the dry reducing agent, or the reducing agent has a water content of 30–45% by weight and a volatile content of 35–45% by weight of the dry reducing agent.

3. A process according to claim 1, characterized in that the reducing agent is deficient in volatile content, the additional heat required for drying being supplied to the drying zone and/or devolatilizing zone by means of shell burners.

4. A process according to claim 1 characterized in that the reducing agent having a surplus volatile content and carbonaceous materials having a low volatile content are admixed.

5. A process according to claim 1 characterized in that the heat content of the gases entering the drying zone is increased by a supply of external heat by means of shell burners and/or central burners.

6. A process according to claim 1, characterized in that oxygen-containing gases are blown into the charge through nozzle-blocks at least in the drying zone of the preheating zone of the rotary kiln.

7. A process according to claim 6, characterized in that oxygen-containing gases are blown into the charge through nozzle-blocks in a zone which extends from the charging and over approximately one-third of the length of the rotary kiln.

8. A process according to claim 6 characterized in that about 20–60% of the total rate at which oxygen-containing gases are supplied into the rotary kiln are blown into the rotary kiln through the nozzle blocks.

9. A process according to claim 7, characterized in that about 20–60% of the total rate at which oxygen-containing gases are supplied into the rotary kiln are blown into the rotary kiln through the nozzle blocks.

10. A process according to claim 6 characterized in that the remaining oxygen-containing in that the remaining oxygen-containing gases are blown into the rotary kiln at the discharge end thereof and approximately parallel to the longitudinal direction of the longitudinal axis of the rotary kiln at a velocity of flow of at least 50 m/sec.

* * * * *

UNITED STATES PATENT AND TRADEMARK OFFICE
CERTIFICATE OF CORRECTION

PATENT NO. : 4,144,052
DATED : March 13, 1979
INVENTOR(S) : Harry Serbent, et al.

It is certified that error appears in the above-identified patent and that said Letters Patent are hereby corrected as shown below:

Column 2, line 20, "34" should be --35--.

Column 3, line 58, "decreases" should be --decreased--.

Column 4, line 13, "quantitues" should be --quantities--.
Column 4, line 21,22, "considerably" should be --considerable--.
Column 4, line 37, "volumentric" should be --volumetric--.
Column 5, line 21, "temperature" should be --temperatures--
Column 6, line 14, "characterizied" should be --characterized--.
Column 6, line 62, delete "in that the remaining oxygen-containing".

Signed and Sealed this

Twentieth Day of November 1979

[SEAL]

Attest:

RUTH C. MASON
Attesting Officer

LUTRELLE F. PARKER
Acting Commissioner of Patents and Trademarks